Dec. 23, 1941.   E. T. WEEKS ET AL   2,267,225
VEHICLE WHEEL BRAKE
Filed July 27, 1940   3 Sheets-Sheet 1
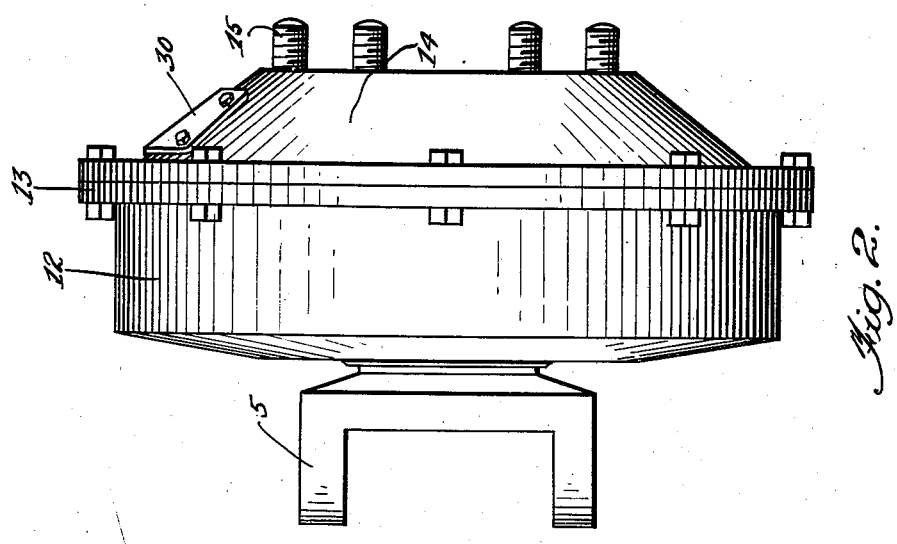
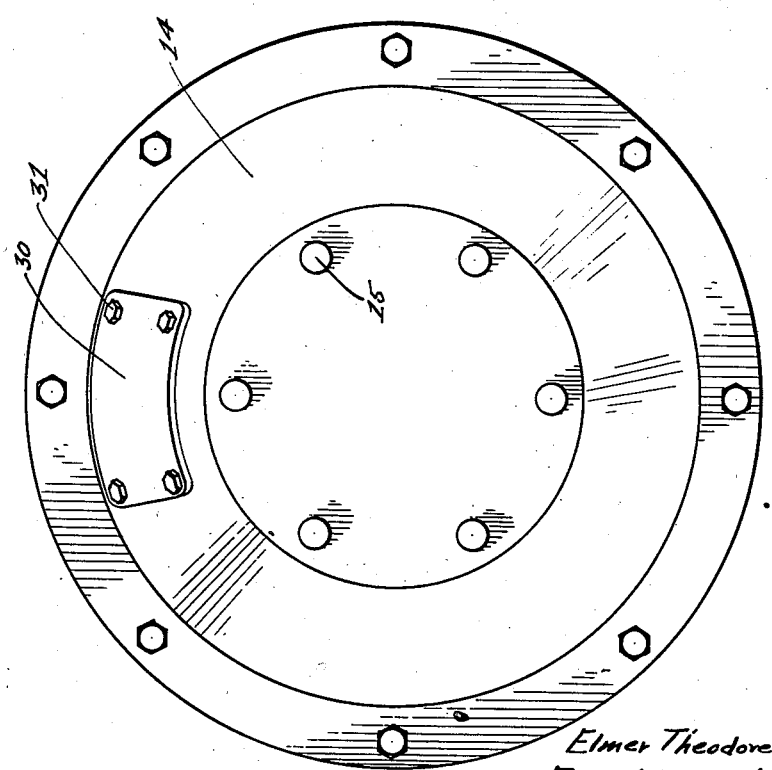
Inventor
Elmer Theodore Weeks
Faye Morrise McCulley
By Clarence A. O'Brien
Attorney Dec. 23, 1941.   E. T. WEEKS ET AL   2,267,225
VEHICLE WHEEL BRAKE
Filed July 27, 1940   3 Sheets-Sheet 2

Inventor
Elmer Theodore Weeks
Faye Morrise McCulley

By Clarence A O'Brien

Attorney

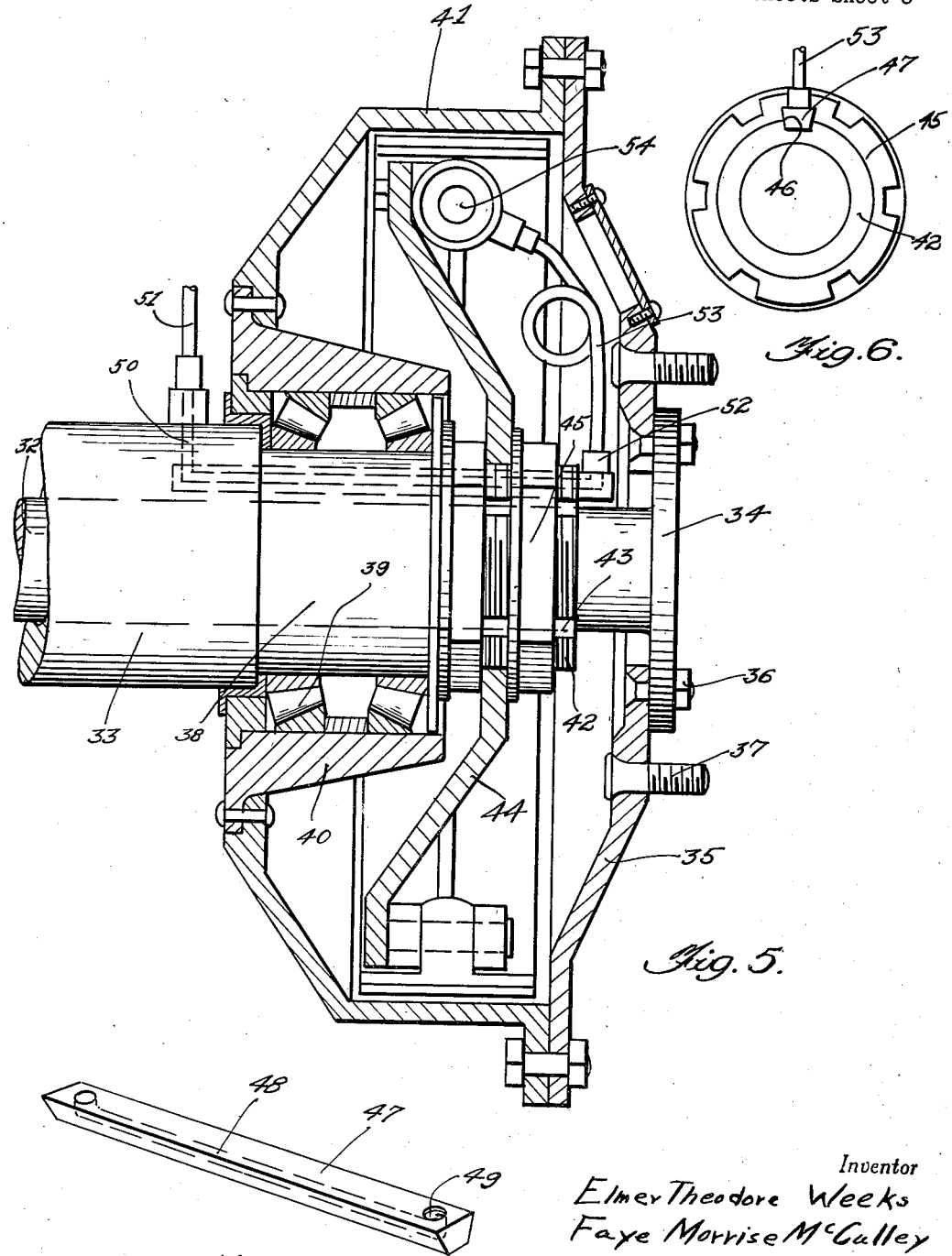

Patented Dec. 23, 1941

2,267,225

UNITED STATES PATENT OFFICE 2,267,225

VEHICLE WHEEL BRAKE

Elmer Theodore Weeks and Faye Morrise McCulley, Scott Bar, Calif.

Application July 27, 1940, Serial No. 348,060

2 Claims. (Cl. 188—152)

The present invention relates to new and useful improvements in vehicle wheel construction and has particular reference to the brake drum usually forming part of the wheel, the principal object of the present invention is to provide a wheel construction in which the brake drum is completely enclosed so as to prevent the entrance of moisture or other foreign substances into the drum housing and which might affect the efficient operation thereof.

In the usual brake drum construction the drum is exposed to the elements and accordingly mud and dirt are adapted to come into contact with the drum and interfere with the efficient operation of the brake shoes when moved into contact with the drum and in winter weather the moisture entering the drum frequently becomes frozen and prevents entirely the operation of the brake shoes.

Accordingly it is an object of the present invention to provide a brake drum housing which completely encloses the brake drum so as to avoid the objectionable features above referred to.

A still further object is to provide a wheel construction of this character of simple and practical arrangement, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a front elevational view of the housing for the brake drum.

Figure 2 is an edge elevational view thereof.

Figure 5 is a transverse sectional view of the drum housing for the rear wheel of the vehicle.

Figure 6 is an end elevational view of the rear axle housing and

Figure 7 is a perspective view of the key mounted in the axle housing and having the passage therein providing the connection for the brake line.

Figure 4:
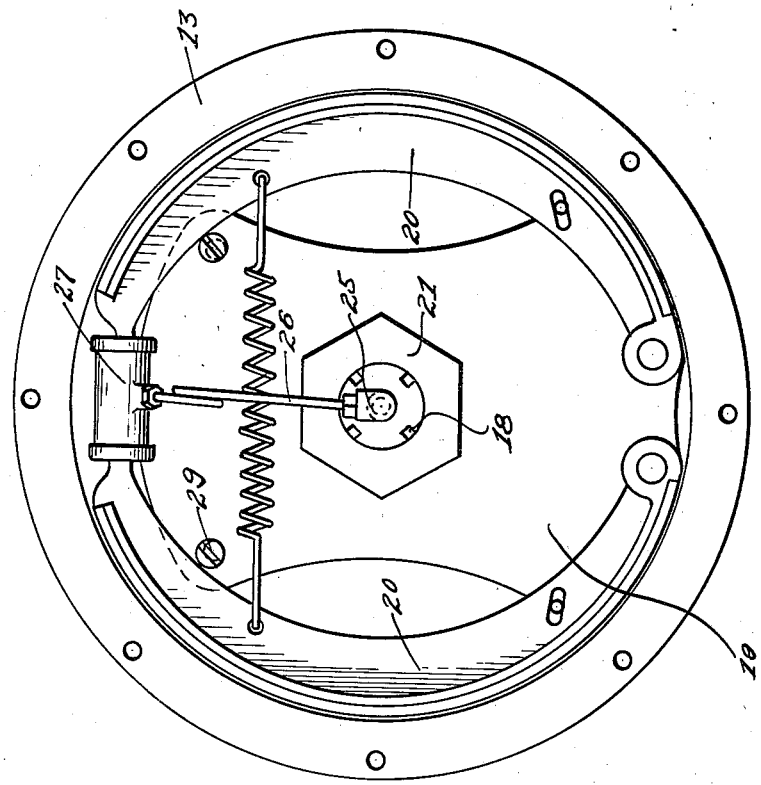
Figure 4 is a front elevational view with the cover plate removed.
Figure 3:
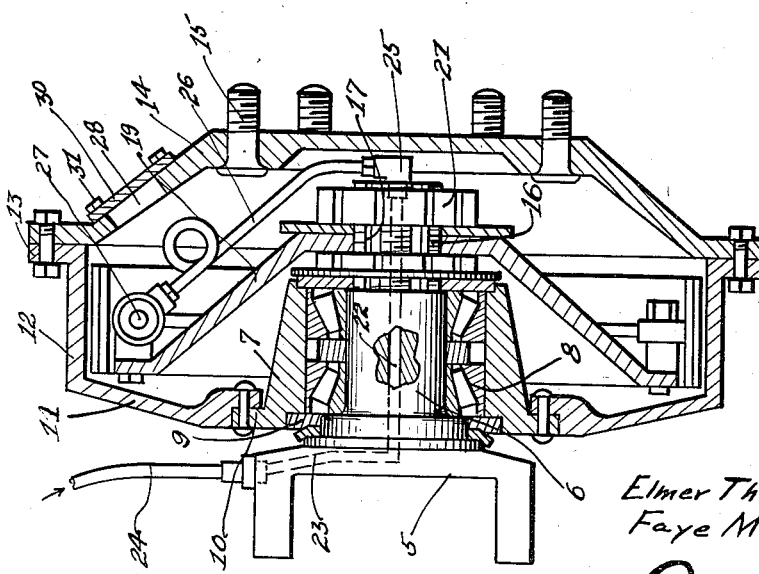
Figure 3 is a transverse sectional view.

Referring now to the drawings in detail wherein for the purpose of illustration I have disclosed a preferred embodiment of the invention and with particular reference to Figs. 1 to 4 inclusive the numeral 5 designates the fork-shaped spindle shoulder on which the spindle 6 is formed for the wheel hub designated generally at 7. Between the spindle and the hub is the usual roller bearing assembly 8 at each end of which is the grease retaining washers 9. The inner end of the hub is formed with a flange 10 to which is secured the inner wall 11 of the brake drum 12.

The outer edge of the brake drum is provided with an outwardly extending flange 13 to which is flatwise secured the cover plate 14 having its central portion provided with the circumferentially arranged lugs 15 on which the vehicle wheel (not shown) is secured in the usual manner.

The outer end of the spindle 6 is provided with a reduced threaded extension 16 having longitudinally extending grooves 17 formed therein for receiving the tongues 18 projecting inwardly of the central opening in the backing plate 19 on which the brake shoes 20 are pivotally mounted in the usual manner. The central opening in the backing plate is adapted to receive the threaded reduced extension 16 of the spindle and the tongue and groove connection between the backing plate and the spindle secures the backing plate against rotation. The backing plate is secured in position by means of the nut 21 threaded on the reduced extension 16.

Extending axially of the spindle 6 is the passage 22, the inner end of the passage terminating in a lateral extension 23 formed in the spindle shoulder 5 and to which the hydraulic brake line 24 is attached. The outer end of the passage is provided with an L-fitting 25 to which a pipe 26 is attached leading to the brake cylinder 27 of conventional construction for operating the free ends of the brake shoes 20 as shown to advantage in Fig. 4 of the drawings.

The cover plate 14 is provided with an opening 28 in a convenient position to provide access to the adjusting screws 29 of the brake shoe, the opening being normally closed by means of a removable plate 30 secured in position by bolts 31.

From the foregoing it will be apparent that the brake shoe 20 and the internal brake surface of the drum 12 are completely enclosed so as to prevent the entrance of foreign matter which might affect the efficient operation of the brake.

In Figs. 5 to 7 inclusive we have illustrated the wheel construction forming our invention applied to the rear axle 32 of a motor driven vehicle which is generally provided with the axle housing 33 and within which the axle is freely rotatable. The outer end of the axle is formed with a flange 34 to which the central portion of the cover plate 35 is secured by means of bolts 36. The cover plate is provided with the usual wheel attaching bolt 37.

The axle housing 33 is reduced as shown at 38 on which the roller bearing assembly 39 is mounted, the wheel hub 40 being positioned on the bearing assembly. To the hub is secured the brake drum 41 to which the cover plate 35 is attached as heretofore explained.

Outwardly of the reduced portion 38 is the externally threaded reduced extension 42 having the longitudinally extending grooves 43 formed therein for securing the backing plate 44 against rotation, the backing plate being secured by the nut 45.

Formed in the axle housing 33 and extending outwardly at the end thereof is the dove-tailed channel 46 within which the key 47 is conformably fitted, the key having a longitudinally extending passage 48 formed therein terminating in lateral ports 49 extending through one face of the key. The port 49 at the inner end of the key communicates with the lateral passage 50 formed in the axle housing and to which the brake line 51 is connected. To the outer port 49 is secured a fitting 52 for attaching the pipes 53 which leads to the brake cylinder 54.

Accordingly the wheel hub 40 carrying the brake drum 41 and cover plate 35 are free to rotate with the axle 32 while the backing plate 44 on which the brake shoes are mounted are secured against rotation on the axle housing 33.

It is believed the details of construction, advantages and manner of operation of the device will be readily understood from the foregoing without further detailed explanation.

What is claimed is:

1. A vehicle wheel construction comprising a rotating hub, a support for the hub having a reduced threaded extension provided with longitudinal grooves, a brake drum including a rear wall connected to the hub, a backing plate mounted on said extension and having tongues engaged in the grooves to secure the plate against rotation, said backing plate including opposite radially disposed portions extending rearwardly and terminating adjacent the brake drum, said plate having hydraulically operated brake mechanism mounted thereon and including a brake cylinder fixedly secured at one edge of the plate and brake shoes pivotally connected at a diametrically opposite edge of the plate and movable into engagement with the drum, a fluid passage in the support having one end connected with the brake cylinder and its other end connected with a brake line and a cover plate secured to the drum and cooperating with the rear wall thereof to enclose the brake shoes, said cover plate having wheel attaching means carried thereby.

2. A vehicle wheel construction comprising a rotating hub, a support for the hub having a reduced threaded extension provided with longitudinal grooves, a brake drum including a rear wall connected to the hub, a backing plate mounted on said extension and having tongues engaged in the grooves to secure the plate against rotation, said plate having hydraulically operated brake mechanism mounted thereon and including a brake cylinder fixedly secured at one edge of the plate and brake shoes pivotally connected at a diametrically opposite edge of the plate and movable into engagement with the drum, a channel in the support, a key conformably fitted therein and having a fluid passage, one end of the passage being connected with the brake cylinder and the other end of the passage being connected with a brake line and a cover plate secured to the drum and cooperating with the rear wall thereof to enclose the brake shoes, said cover plate having wheel attaching means carried thereby.

ELMER THEODORE WEEKS.
FAYE MORRISE McCULLEY.